United States Patent
Pandit et al.

(10) Patent No.: US 10,966,121 B1
(45) Date of Patent: Mar. 30, 2021

(54) CENTRALIZED MANAGEMENT OF WIRELESS RELAY NODE EQUIPMENT IN A FIFTH GENERATION (5G) OR OTHER NEXT GENERATION NETWORKS

(71) Applicant: AT&T Intellectual Property I, L.P., Atlanta, GA (US)

(72) Inventors: Kartik Pandit, Aberdeen, NJ (US); Shweta Vachhani, Edison, NJ (US); Tzuu-Yi Wang, Newtown, PA (US); Steven A. Monetti, Mountain Lakes, NJ (US); Kenichi Futamura, Middletown, NJ (US); Simon Tse, Holmdel, NJ (US); Narayan Padi, Cedar Knolls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/918,612

(22) Filed: Jul. 1, 2020

(51) Int. Cl.
| | |
|---|---|
| *H04W 28/16* | (2009.01) |
| *H04W 24/08* | (2009.01) |
| *H04W 88/12* | (2009.01) |
| *H04W 88/08* | (2009.01) |

(52) U.S. Cl.
CPC ........... *H04W 28/16* (2013.01); *H04W 24/08* (2013.01); *H04W 88/085* (2013.01); *H04W 88/12* (2013.01)

(58) Field of Classification Search
CPC ... H04W 28/16; H04W 24/08; H04W 88/085; H04W 88/12
See application file for complete search history.

(56) References Cited

U.S. PATENT DOCUMENTS

| | | | |
|---|---|---|---|
| 2020/0022054 A1* | 1/2020 | Hong | H04W 48/20 |
| 2020/0336920 A1* | 10/2020 | Li | H04W 16/28 |

OTHER PUBLICATIONS

"5G; NR; User Equipment (UE) radio access capabilities )3GPP TS 38.306 version 15.5.0 Release 15)" 3GPP, ETSI TS 138 306 V15.5.0 (May 2019), 51 pages.
"3rd Generation Partnership Project; Technical Specification Group Services and System Aspects; Release 16 Description; Summary of Rel-16 Work Items (Release 16)" 3GPP, 3GPP TR 21.916 V0.5.0 (Jul. 2020), 115 pages.

* cited by examiner

*Primary Examiner* — Marisol Figueroa
(74) *Attorney, Agent, or Firm* — Amin, Turocy & Watson, LLP

(57) ABSTRACT

The technologies described herein are generally directed to centralized management of wireless relay node equipment in a fifth generation (5G) or other next generation networks. In accordance with one or more embodiments, a method described herein can include facilitating identifying a connection between first network equipment and second network equipment, the first network equipment being connected to a user equipment and the second network equipment. In embodiments, the method can further include facilitating monitoring the connection between the first network equipment and the second network equipment, resulting in monitoring data, wherein the second network equipment is communicatively coupled to backhaul network equipment, and with the user equipment being communicatively coupled to the backhaul network equipment via the second network equipment. Further, based on the monitoring data, adjusting, by the centralized controller system, a characteristic of the connection, in accordance with embodiments.

14 Claims, 10 Drawing Sheets

700 ⬐

702

FACILITATING IDENTIFYING A CONNECTION BETWEEN FIRST NETWORK EQUIPMENT AND SECOND NETWORK EQUIPMENT, WHEREIN THE FIRST NETWORK EQUIPMENT IS CONNECTED, VIA A NETWORK, TO A USER EQUIPMENT AND THE SECOND NETWORK EQUIPMENT

704

FACILITATING MONITORING THE CONNECTION BETWEEN THE FIRST NETWORK EQUIPMENT AND THE SECOND NETWORK EQUIPMENT, RESULTING IN MONITORING DATA, WHEREIN THE SECOND NETWORK EQUIPMENT IS COMMUNICATIVELY COUPLED TO BACKHAUL NETWORK EQUIPMENT, AND WHEREIN THE USER EQUIPMENT IS COMMUNICATIVELY COUPLED TO THE BACKHAUL NETWORK EQUIPMENT VIA THE SECOND NETWORK EQUIPMENT

CONNECTION MONITORING COMPONENT 124

706

BASED ON THE MONITORING DATA, ADJUSTING A CHARACTERISTIC OF THE CONNECTION

CONNECTION MANAGING COMPONENT 128

FIG. 7

CENTRALIZED MANAGEMENT OF WIRELESS RELAY NODE EQUIPMENT IN A FIFTH GENERATION (5G) OR OTHER NEXT GENERATION NETWORKS

TECHNICAL FIELD

The subject application is related to implementation of fifth generation (5G) or other next generation wireless communication systems, and, for example, placement of antennas used to implement next generation networks.

BRIEF DESCRIPTION OF THE DRAWINGS

The technology described herein is illustrated by way of example and not limited in the accompanying figures in which like reference numerals indicate similar elements and in which:

FIG. 7 illustrates an example system that can facilitate centralized management of wireless relay node equipment in a fifth generation (5G) or other next generation networks, in accordance with one or more embodiments.

DETAILED DESCRIPTION

Figure 1:
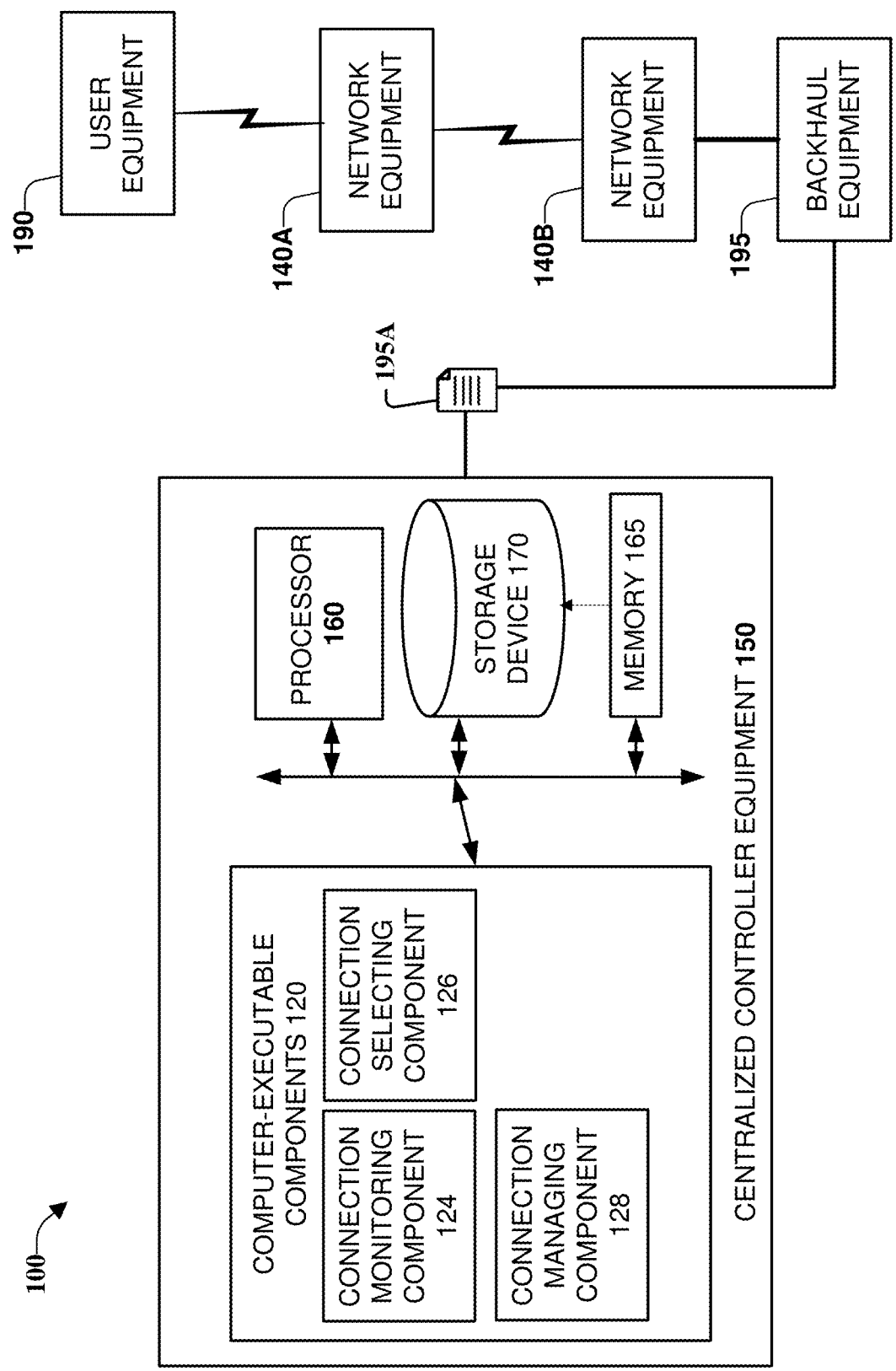
FIG. 1 is an architecture diagram of an example system that can facilitate implementing and maintaining a wireless network, in accordance with one or more embodiments.

Generally speaking, one or more embodiments can facilitate centralized management of wireless relay node equipment in a network. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor distributed unit (donor DU node) equipment and relay distributed unit (relay DU) node equipment, an example use of these being in a network with an integrated access backhaul network topology described in one or more embodiments below.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., rapidly selecting network routes based on signal quality information), that are not abstract and cannot be performed as a set of mental acts by a human. For example, a human, or even a plurality of humans, cannot efficiently integrate wireless data receipt and demodulation (which generally cannot be performed manually by a human) and detailed analysis of information about a wireless connection, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate the implementation and management of wireless links between a user equipment and a backhaul network. One having skill in the relevant art(s), given the description herein, would appreciate that some network equipment that utilized by some embodiments, are termed wireless relay node equipment, to describe that some embodiments can provide wireless links between user equipment and backhaul equipment by establishing connections between node network equipment that can relay communications along selected communication paths. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate implementing and maintaining a wireless network, in accordance with one or more embodiments. More specifically, one or more embodiments can facilitate centralized management of wireless relay node equipment. For purposes of brevity, description of like elements and/or processes employed in other embodiments is omitted.

System 100 can include centralized controller equipment 150 coupled to backhaul equipment 195. System 100 can also include user equipment 190 coupled (e.g., via a wireless connection) to network equipment 140A, with this component being further coupled to backhaul equipment 195 via network equipment 140B. With this figure, the operation of components of centralized controller equipment 150 is discussed, and in FIG. 3, the operation of components of network equipment 140A-B is discussed.

In one or more embodiments, centralized controller equipment 150 can include memory 165, processor 160, storage device 170, as well as other components to implement and provide functions for system 100, and other embodiments described herein. Computer executable components 120 can include instructions that, when executed by processor 160, can facilitate performance of operations defined by the executable component(s) and/or instruction (s), e.g., connection monitoring component 124, connection selecting component 126, connection managing component 128, and additional components which can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, centralized controller equipment 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

Networks that can be facilitated by one or more implementations described herein can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. It should be noted that, although some components of diagrams discussed herein depict what could be termed a direct connection between network equipment (e.g., backhaul equipment 195 coupled to centralized controller equipment 150), this depiction can also represent communicative coupling of equipment via other network equipment not shown in the figures.

In one or more embodiments, computer and/or computing-based elements 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining connection monitoring component 124. In one or more embodiments, connection monitoring component 124 can facilitate identifying a connection between network equipment 140A and network equipment 140B. In this example, network equipment 140A can be coupled to user equipment 190 and network equipment 140B.

In embodiments, connection monitoring component 124 can further facilitate monitoring the connection between the first network equipment and the second network equipment, resulting in monitoring data, wherein the second network equipment is communicatively coupled to backhaul equipment 195. Based on this arrangement, in some implementations, user equipment 190 can be communicatively coupled to backhaul equipment 195 via network equipments 140A-B.

In should be noted that backhaul equipment 195 is a non-limiting term describing a connection to a network, and although a backhaul network can include intermediate connections between a user equipment connected to base station equipment (e.g., the so-called front-haul portion of a network) other types of networks and network equipment can also benefit from the implementation of concepts described herein.

Continuing this example, in one or more embodiments, computer executable components 120 can further include instructions that, when executed by processor 160, can facilitate performance of operations defining connection managing component 128. In one or more implementations of connection managing component 128, based on the monitoring data, connection managing component 128 can adjust a characteristic of the connection between network equipments 140A-B. For example, if connection monitoring component 124 determined a quality measurement of a connection was below a particular threshold, connection managing component can be employed to either modify a characteristic of the connection (e.g., allocated bandwidth resources) or connection selecting component 126 can select a different connection, e.g., as discussed with FIG. 4 below.

Figure 2:
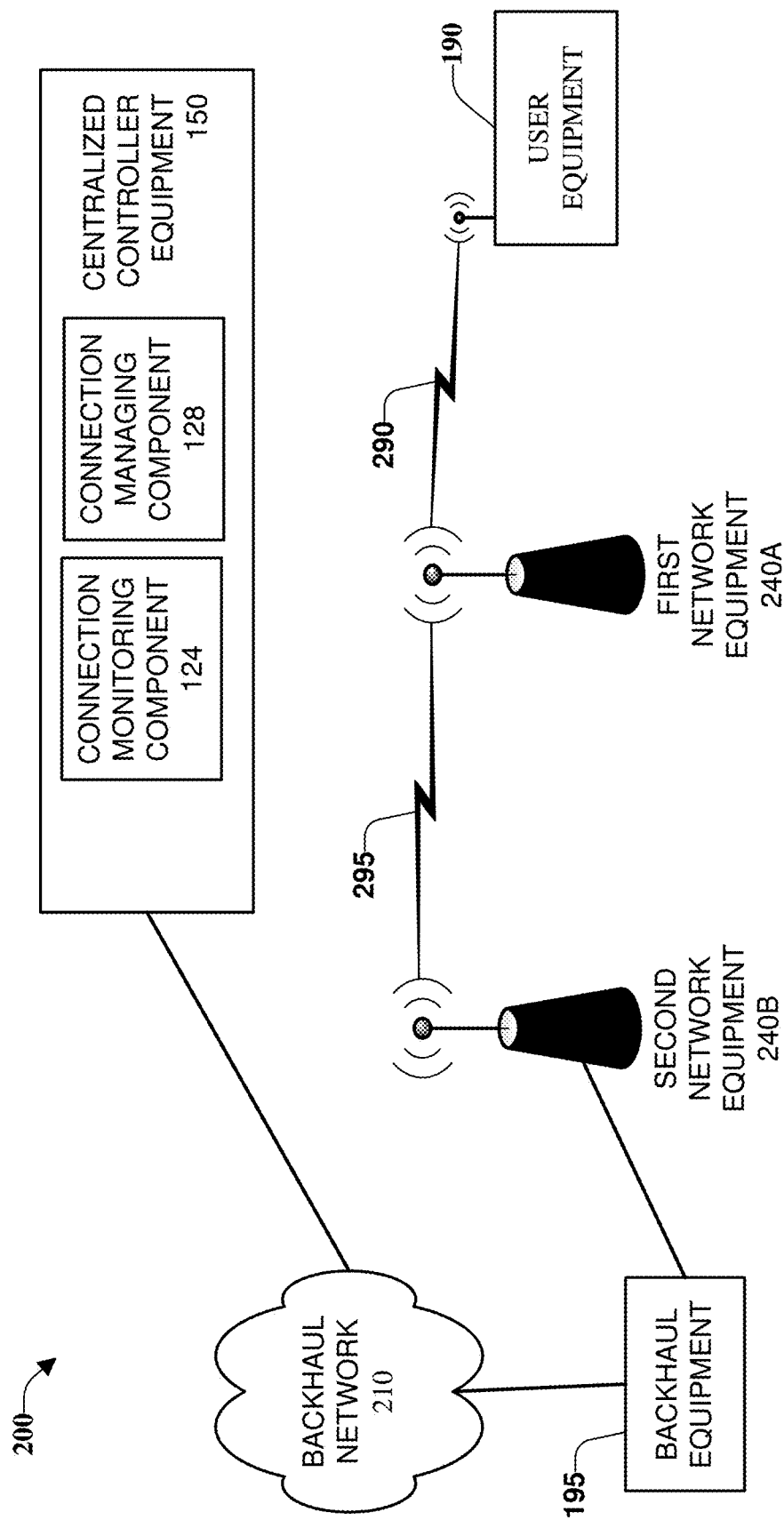
FIG. 2 is a diagram of a non-limiting example system for facilitating implementation and operation of a wireless network, in accordance with one or more embodiments.

FIG. 2 is a diagram of a non-limiting example system 200 for facilitating implementation and operation of a wireless network, in accordance with one or more embodiments. For purposes of brevity, description of like elements and/or processes employed in other embodiments is omitted. System 200 can include centralized controller equipment 150, backhaul network 210, backhaul equipment 195, first network equipment 210A, second network equipment 210B, and user equipment 190. In this non-limiting example, centralized controller equipment 150 can include connection monitoring component 124 and connection managing component 128.

In an example depicted, user equipment 190 is specified to be connected to a core network (not shown) for implementation of different functions, e.g., via wireless link 290. In one or more embodiments, user equipment 190 can establish a connection with first network 240A as if this equipment is providing base station services, e.g., services providing a communications link from user equipment 190 to the core network. Unlike some other network equipment that provide base station functions, in this example, first network equipment is not communicatively coupled to the core network by a non-wireless connection, e.g., typical base stations have high speed connections other network equipment (e.g., backhaul equipment 195) by fiber-optic or wired connections.

In one or more embodiments, to provide connectivity with the core network via backhaul equipment 195, connection 295 can be established between first network equipment 240A and second network equipment 240B. In some exemplary implementations, first and second network equipments 240A-B can use high bandwidth communications connections, e.g., mmWave connectivity both for communicating with user equipment 190 and providing high-speed link 295. As would be appreciated by one having skill in the relevant art(s), given the disclosure herein, this use of high-bandwidth wireless connectivity can provide speed comparable with conventional fiber-optic and wire connections, thus reducing the need for these connections for some base stations.

In one or more embodiments, to facilitate the establishment of connection 295, centralized controller equipment 150 can monitor connections and maintain high speed network paths via multiple wirelessly connected network equipments, e.g., network equipments 240A-B, as well as additional network equipments described with FIG. 4 below. As discussed further below, to facilitate high speed connections via this approach, based on the monitoring of connection 295 characteristics, centralized controller equipment 150 can alter one or more characteristics of connection 295, or as described with FIG. 4 below, a different network equipment can be selected for providing the link between first network equipment 240A, thus giving user equipment 190 a different path to backhaul network 210.

Examining the implementation of the above features in greater detail, different computer-executable components 120 are further discussed below. For example, in one or more embodiments, computer executable components 120 can include instructions that, when executed by processor 160, can facilitate performance of operations defining connection monitoring component 124. In one or more embodiments depicted in FIG. 2, connection monitoring component 124 can monitor characteristics of connection 295, e.g., based either on directly obtained measurements (e.g., by available sensors in proximity to connection 295) or from monitoring data measured by other network equipment and relayed to centralized controller equipment 150.

Continuing this non-limiting example implementation, in one or more embodiments, computer executable components 120 can include instructions that, when executed by processor 160, can facilitate performance of operations defining connection managing component 128. In one or more embodiments, connection managing component 128 can, based on the monitoring data from connection monitoring component 124, adjust a characteristic connection 295. One having skill in the relevant art(s), given the description herein, would appreciate different adjustments to different characteristics of connection 195, and further details are discussed in detail with FIGS. 5-6 below.

In additional embodiments, computer executable components 120 can include further instructions that can facilitate operations by connection monitoring component 124 to estimate the capacity of a connection (e.g., connection 195), and connection managing component 128 can adjust the characteristic of connection 195 further based on this capacity estimate. For example, if capacity is estimated to be lower than current or predicted future requirements for traffic of connection 295, characteristics affecting the capacity of connection 195 can be altered based on this capacity estimate, e.g., allocation of bandwidth resources can be increased for connection 295.

In a variation of the monitoring of connection 295 discussed above, one or more embodiments can with selected frequency, estimate the traffic demand of the second network equipment for connections to the backhaul network, and connection managing component 128 can adjust the characteristic of connection 295 further based on this traffic demand estimate. In another variation of the monitoring by connection monitoring component 124 discussed above, one or more embodiments can with selected frequency, identify buffer information corresponding to a traffic buffer of the second network equipment (not shown), and connection managing component 128 can adjust the characteristic of connection 295 further based on this traffic buffer information.

Figure 3:
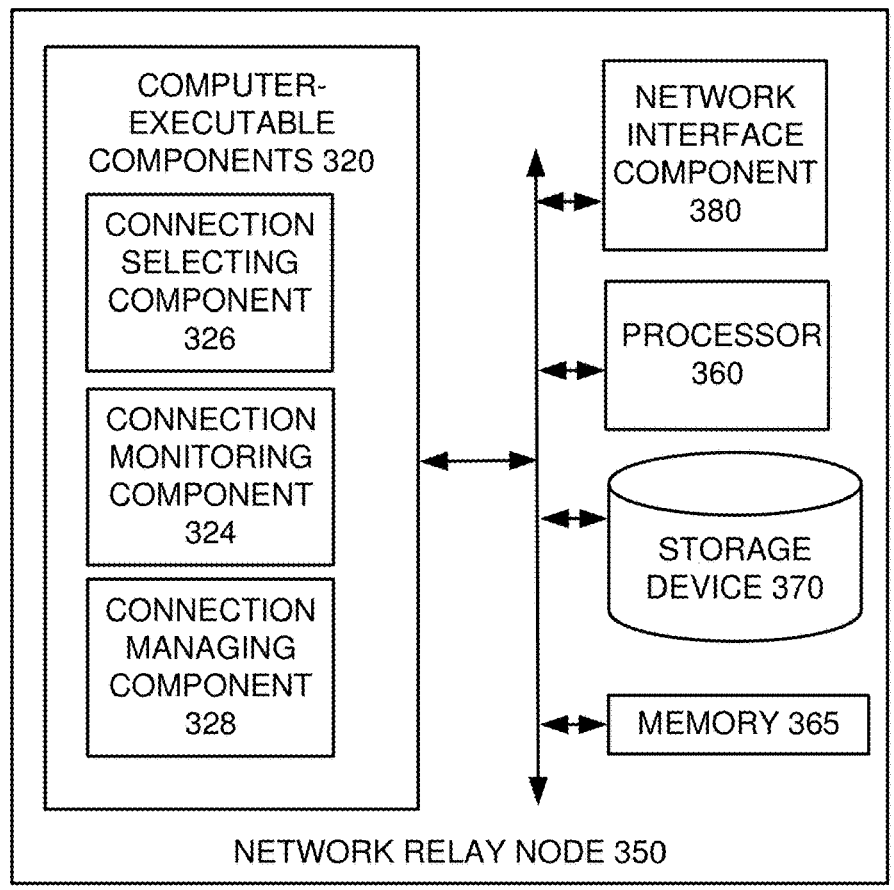
FIG. 3 is a diagram of a non-limiting example system for facilitating implementation and operation of a wireless network, in accordance with one or more embodiments.

FIG. 3 is a diagram of a non-limiting example system 300 for facilitating implementation and operation of a wireless network, in accordance with one or more embodiments. System 300 can include network relay node 350 coupled to backhaul equipment 195. It should be appreciated that FIG. 3 can depict one or more aspects of network equipments 140A-B described with FIG. 1 above, and In one or more embodiments, network relay node 350 can include memory 365, processor 360, storage device 370, as well as other components to implement and provide functions for system 300, and other embodiments described herein. Computer executable components 320 can include instructions that, when executed by processor 360, can facilitate performance of operations defined by the executable component(s) and/or instruction(s), e.g., connection monitoring component 324, connection selecting component 326, connection selecting component 326, and additional components which can improve the operation of system 300. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, centralized controller equipment 150 can further comprise various computer and/or computing-based elements described herein with reference to operating environment 1000 and FIG. 10.

Similar to memory 165 discussed above, in some embodiments, memory 365 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 365 are described below with reference to system memory 1006 and FIG. 10. Such examples of memory 365 can be employed to implement any embodiments of the subject disclosure.

According to multiple embodiments, processor 360 can comprise one or more processors and/or electronic circuitry that can implement one or more computer and/or machine readable, writable, and/or executable components and/or instructions that can be stored on memory 365. For example, processor 360 can perform various operations that can be specified by such computer and/or machine readable, writable, and/or executable components and/or instructions including, but not limited to, logic, control, input/output (I/O), arithmetic, and/or the like. In some embodiments, processor 360 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 360 are described below with reference to processing unit 1004 of FIG. 10. Such examples of processor 360 can be employed to implement any embodiments of the subject disclosure.

In one or more embodiments, computer and/or computing-based elements 320 can be used in connection with implementing one or more of the systems, devices, components, and/or computer-implemented operations shown and described in connection with FIG. 3 or other figures disclosed herein. For example, in one or more embodiments, computer executable components 320 can include instructions that, when executed by processor 360, can facilitate performance of operations defining connection selecting component 326, connection monitoring component 324, connection managing component 328, and other components that can implement different features described herein, e.g., feature of system 300.

In one or more embodiments, network interface component 380 of network relay node 350 (e.g., with operations similar to first network component 240A) can establish a connection 290 with user equipment 190, e.g., as a connection between user equipment 190 and a network relay node 350, operating as a base station. It should be noted that, when network relay node 350 provides connections such as connection 290 to user equipments 190, as discussed with FIG. 5 below, network relay node 350 can also be referred to as donor node equipment.

Continuing this example, in one or more embodiments, with connection 290 to user equipment 190, network relay node 350 is at the beginning of a network path from user equipment 190 to backhaul network 210, and further to a core network (not shown). Further to establishing this network path, in one or more embodiments, computer executable components 320 can include instructions that, when executed by processor 360, can facilitate performance of operations defining connection monitoring component 324, which can monitor network connection characteristics as well as instructions from centralized controller equipment 150.

For example, in this example instance, first routing information can correspond to a first route from first network equipment 240A to backhaul equipment 195 via second network equipment 240B, with the first route being selected, for example, based on comparing the first route to other available routes, e.g., discussed with FIG. 4 below. In one or more embodiments, based on the first routing information, connection 295 can be established with the second network equipment 240B.

Figure 4:
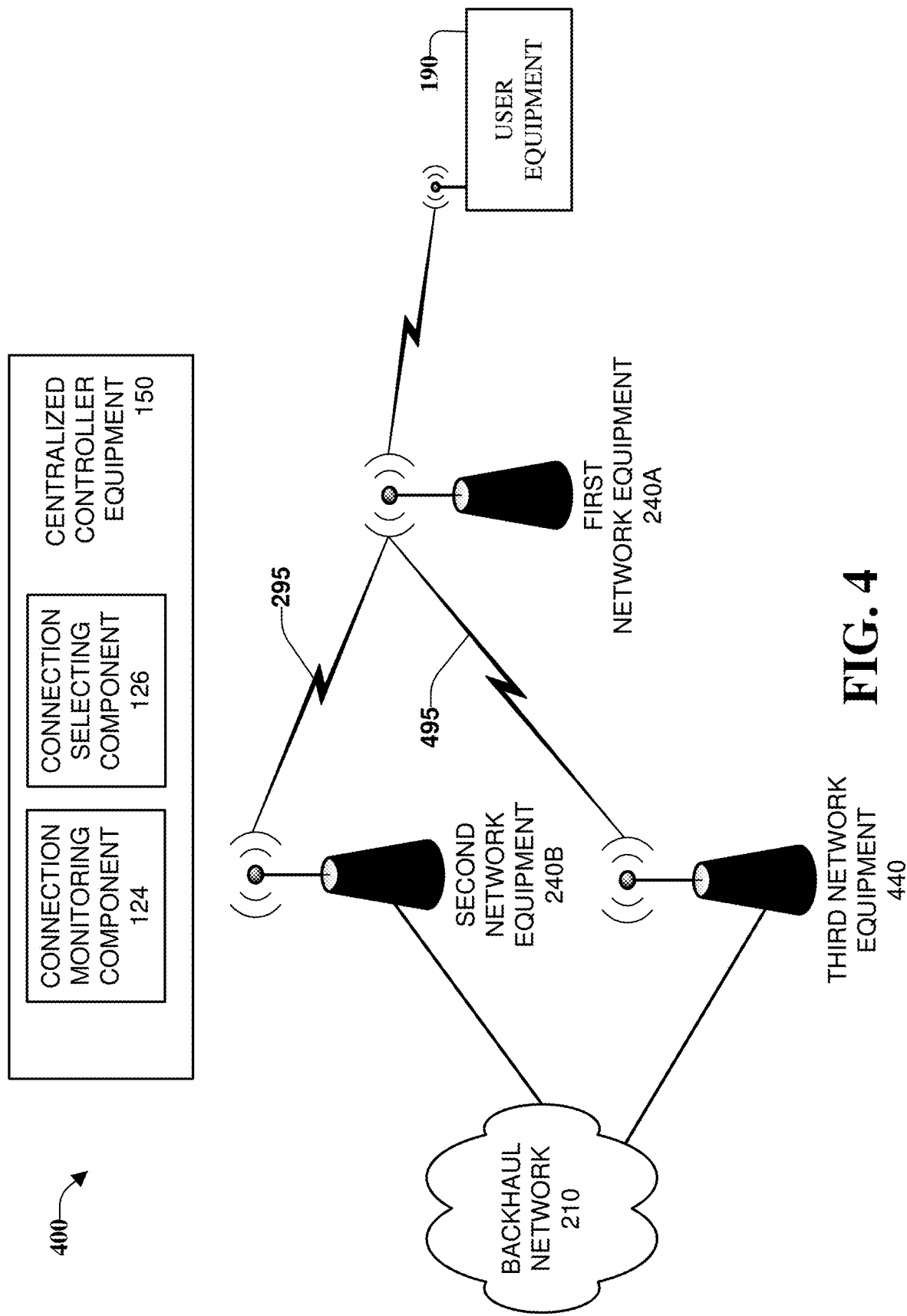
FIG. 4 is a diagram of a non-limiting example system for facilitating implementation and operation of a wireless network, in accordance with one or more embodiments.

FIG. 4 is a diagram of a non-limiting example system 400 for facilitating implementation and operation of a wireless network, in accordance with one or more embodiments. System 400 can include centralized controller equipment 150, backhaul network 210, first network equipment 210A, second network equipment 210B, third network equipment 440, and user equipment 190. Centralized controller equipment 150 includes connection selecting component 126 and connection managing component 128.

In an example depicted in FIG. 4, based on the monitoring data (e.g., collected and analyzed by connection monitoring component 124), changing, by centralized controller equipment 150 (e.g., by connection selecting component 126), a different network equipment for implementation of a connection link path. For example, as depicted in FIG. 4, when connection monitoring component 124 collects information that connection 495 is a link of sufficiently better throughput than connection 295, connection selecting component 126 can switch to third network equipment 440 from second network equipment 240B.

In one or more embodiments, connection selecting component 126 can select nodes by evaluating link selection policies, e.g., to select network link paths with the highest achievable throughput. For example, in one policy approach, links can be selected based on having a relatively high SNR, with an approach that selects paths with the highest quality first (HQF). Another factor that can be considered is the minimizing of the number of hops in a selected path. In a similar approach, a physical distance covered by a connection path can be a factor evaluated. In some implementations, a limit on the number of child nodes in a path can be used to reduce the number of link hops with less analysis. Other factor that can be evaluated include, but are not limited to, synchronization signal reference signal received power (SS-RSRP), synchronization signal channel state information (SS-CSI), block error rate (BLER), bit error (BER), latency due to hybrid automatic repeat request (HARD), signal to interference ratio (SIR), cross-link interference (CLI), and average radio or resource block utilization as a measurement of congestion.

Figure 5:
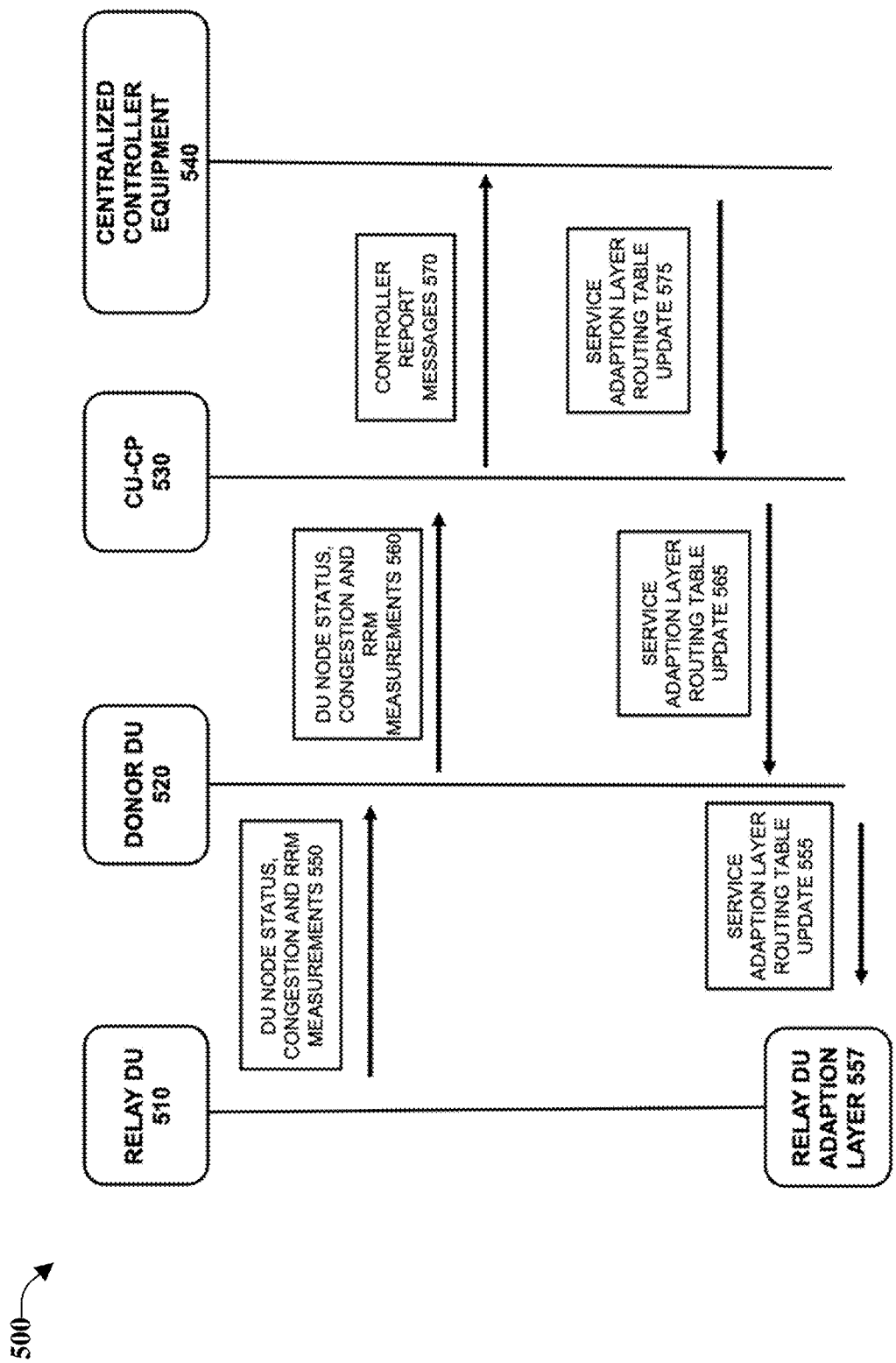
FIG. 5 depicts a functional flow diagram of an example system for implementing an integrated access backhaul topology, in accordance with one or more embodiments.

FIG. 5 depicts a functional flow diagram of an example system 500 for implementing an access backhaul topology, in accordance with one or more embodiments. As depicted, FIG. 5 includes relay distributed unit (relay DU) 510 equipment, donor distributed unit (donor DU) 520 equipment, centralized unit-control plane (CU-CP) equipment 530, and centralized controller equipment 540, in accordance with one or more embodiments. In this diagram, information exchanged between equipment is discussed further, with embodiments below.

As depicted in FIG. 5, in a non-limiting example of one or more embodiments being utilized to improve an integrated access backhaul topology, centralized controller equipment 540 can be used to provide some of the functions described with respect to centralized controller equipment 150 discussed above. In this example, different components are shown collecting connection information and providing this information to centralized controller equipment 540. Information collected by different network equipment can include, but is not limited to, DU node status, congestion and radio resource management (RRM) measurements 550, DU node status, congestion and RRM measurements 560, and controller report messages 570.

After receiving controller report messages 570, centralized controller equipment 540 can analyze the messages and generate signals to adjust different characteristics of connections, e.g., service adaption layer routing table update 555, service adaption layer routing table update 565, and service adaption layer routing table update 575 can be propagated to different network equipment for use in making routing selections.

Figure 6:
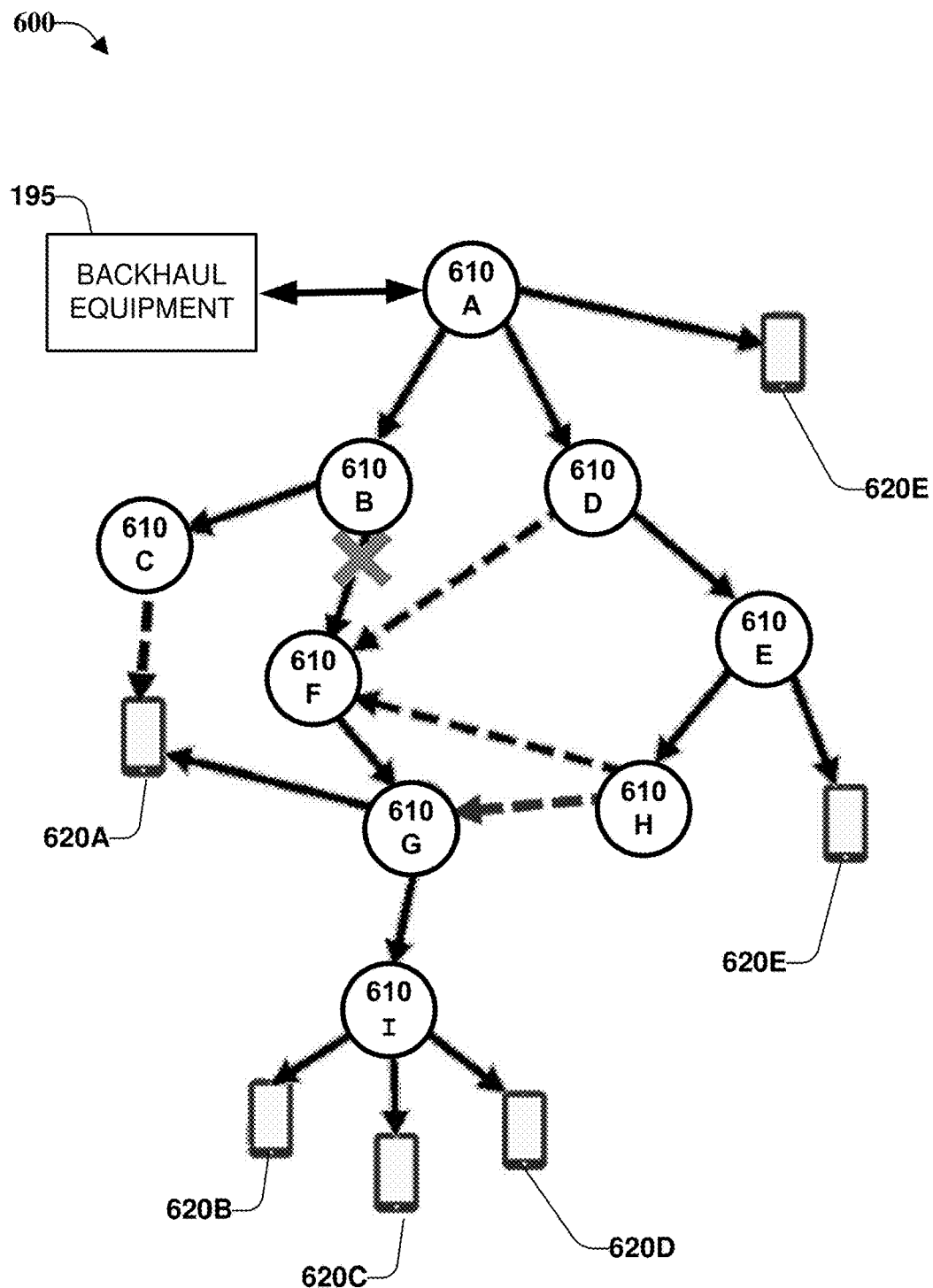
FIG. 6 depicts a non-limiting example network implementation of one or more embodiments described herein, in accordance with one or more embodiments.

FIG. 6 depicts a non-limiting example 600 network implementation of one or more embodiments described herein, in accordance with one or more embodiments. Example 600 includes backhaul equipment 195, donor node 610A, user equipment 620A-F, and relay node equipment 610B-I, with at least relay node equipment 610A, 610C, 610E, 610G, and 610I also providing wireless connectivity to user devices 620F, 620A, 620E, 620A, and 620B-D, respectively.

FIG. 7 illustrates an example system 700 that can facilitate implementing and managing relay connections in a wireless network, in accordance with one or more embodiments. In one or more embodiments, connection monitoring component 124 can be configured to facilitate identifying a connection between first network equipment and second network equipment, wherein the first network equipment is connected, via a network, to a user equipment and the second network equipment.

Further, in one or more embodiments, connection monitoring component 124 can be configured to facilitate monitoring the connection between the first network equipment and the second network equipment, resulting in monitoring data, wherein the second network equipment is communicatively coupled to backhaul network equipment, and wherein the user equipment is communicatively coupled to the backhaul network equipment via the second network equipment. In addition, in one or more embodiments, connection managing component 128 can be configured to, based on the monitoring of data, adjust a characteristic of the connection.

It should be noted that, as described above and throughout this disclosure, in one or more embodiments described herein, centralized controller equipment 540 can have broad capabilities to monitor connections between and among network equipment including, but not limited to, donor DU 520/node equipment, relay DU 510/node equipment, e.g., including any relay DU 510/node equipment and any other relay DU 510/node equipment.

Figure 8:
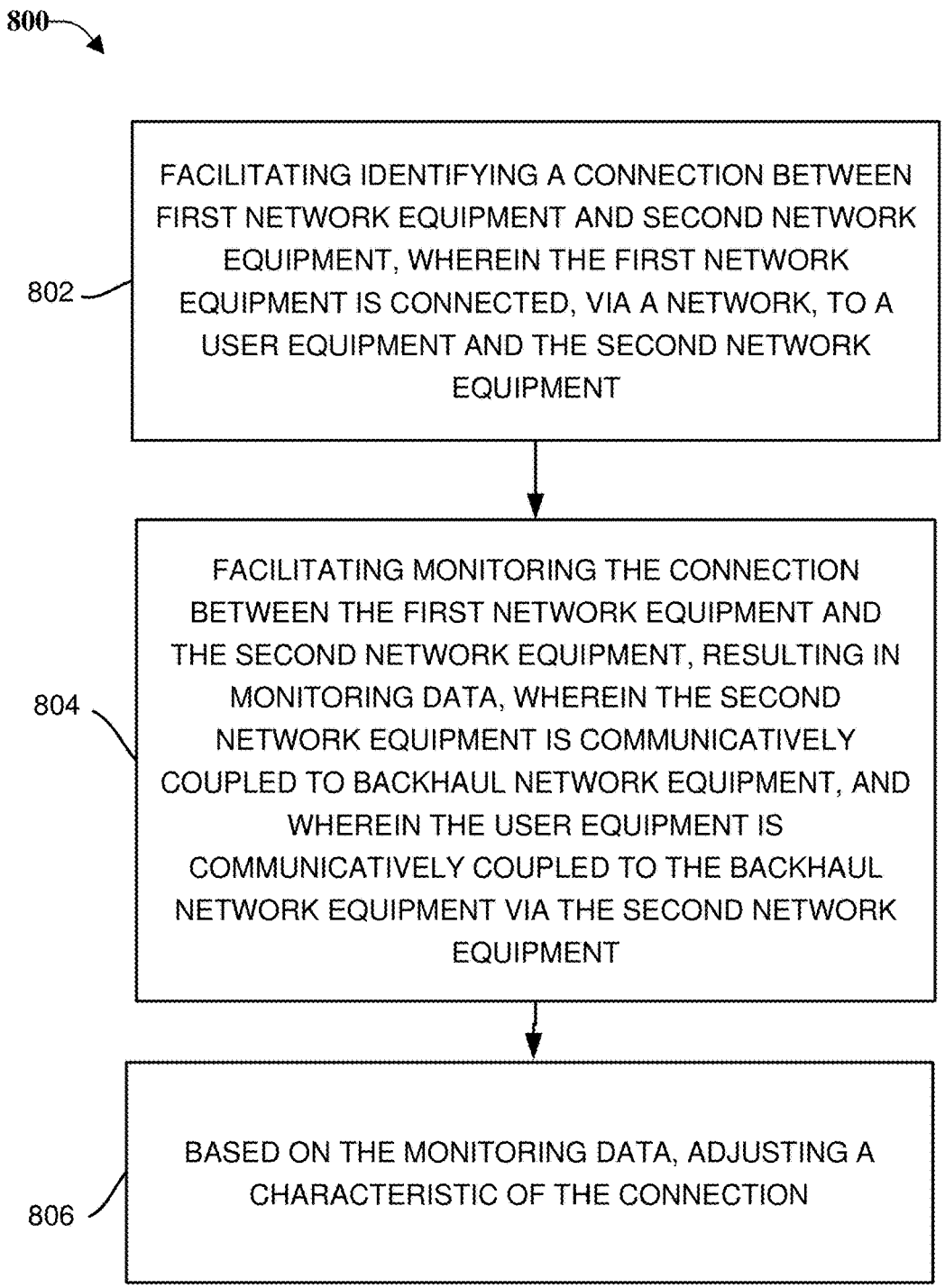
FIG. 8 illustrates a flow diagram of an example method that can facilitate centralized management of wireless relay node equipment in a fifth generation (5G) or other next generation networks, in accordance with one or more embodiments.

FIG. 8 illustrates a flow diagram of an example method 800 that can facilitate centralized management of wireless relay node equipment in a fifth generation (5G) or other next generation networks, in accordance with one or more embodiments. For purposes of brevity, description of like elements and/or processes employed in other embodiments is omitted.

At 802, method 800 can comprise facilitating, by centralized controller equipment 540 comprising a processor, identifying a connection between first network equipment and second network equipment, wherein the first network equipment is connected, via a network, to a user equipment and the second network equipment. At 804, method 800 can comprise facilitating, by centralized controller equipment, monitoring the connection between the first network equipment and the second network equipment, resulting in monitoring data, wherein the second network equipment is communicatively coupled to backhaul network equipment, and wherein the user equipment is communicatively coupled to the backhaul network equipment via the second network equipment. At 806, method 800 can comprise, based on the monitoring data, adjusting, by centralized controller equipment, a characteristic of the connection.

Figure 9:
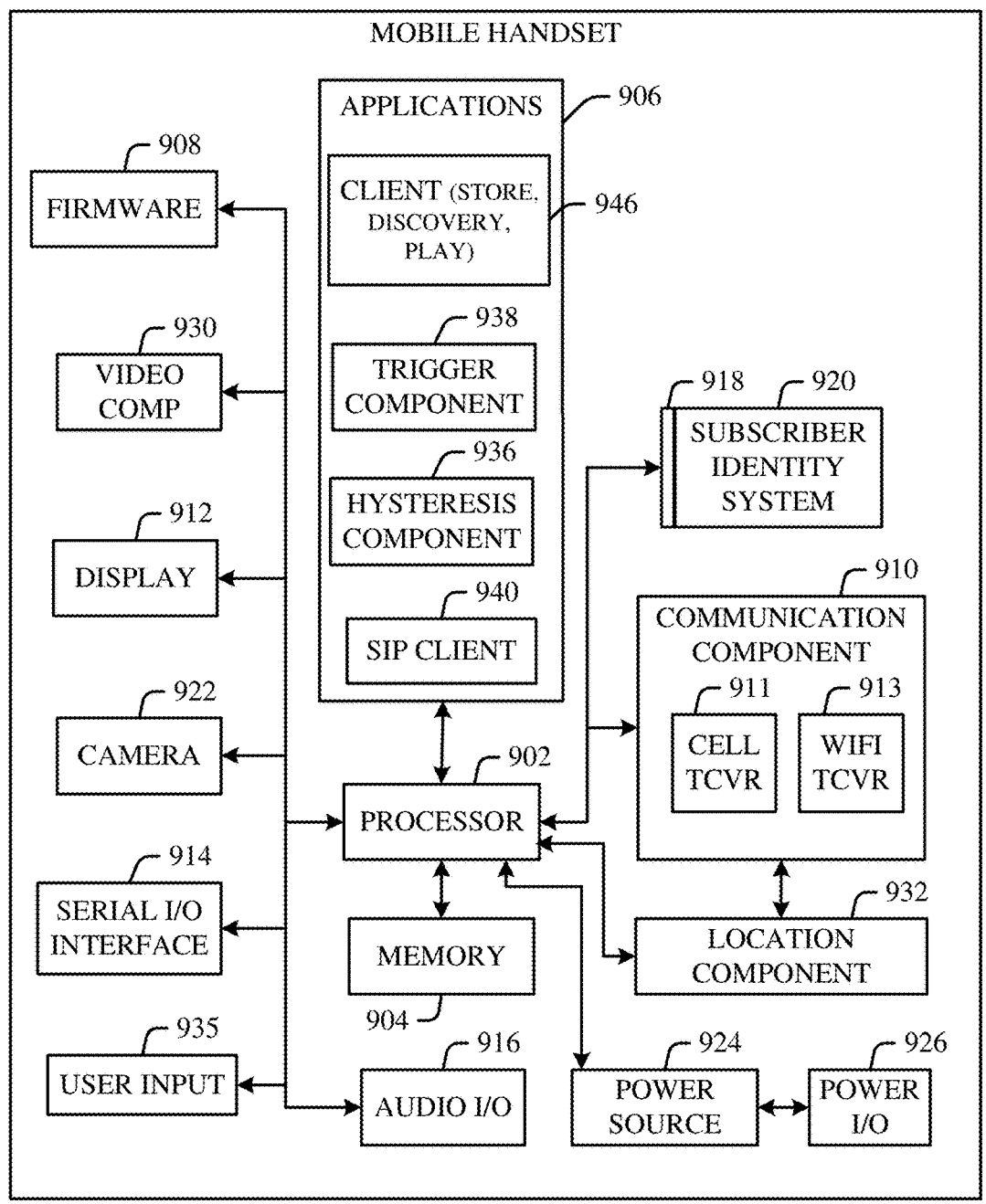
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
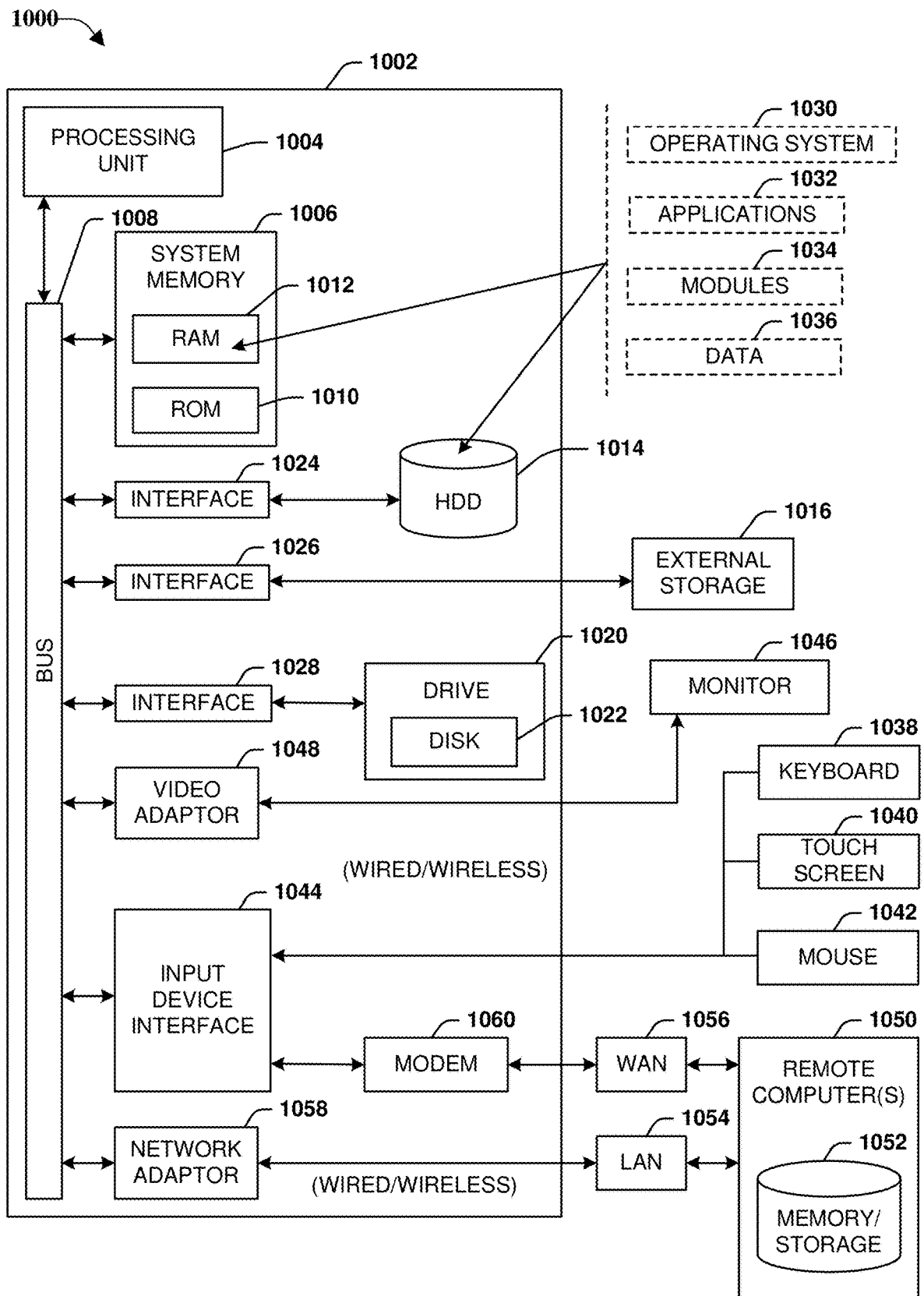
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method comprising:

facilitating, by a centralized controller system comprising a processor, identifying a connection between first network equipment and second network equipment, wherein the first network equipment is connected, via a network, to a user equipment and the second network equipment;

facilitating, by the centralized controller system, monitoring the connection between the first network equipment and the second network equipment, resulting in monitoring data, wherein the second network equipment is communicatively coupled to backhaul network equipment, and wherein the user equipment is communicatively coupled to the backhaul network equipment via the second network equipment; and based on the monitoring data, adjusting, by the centralized controller system, a characteristic of the connection.

2. The method of claim 1, wherein the second network equipment comprises a donor node adhering to an integrated access backhaul network topology.

3. The method of claim 1, further comprising, further based on the monitoring data, changing, by the centralized controller system, the connection to be between the first network equipment and a third network equipment different from the second network equipment.

4. The method of claim 1, wherein adjusting the characteristic comprises adjusting a bandwidth resource of bandwidth resources provided to enable the connection.

5. The method of claim 1, wherein the user equipment pseudo randomly selected the first network equipment from a group of network equipment defined based on a signal strength of ones of the group of network equipment compared to other network equipment of the group of network equipment other than the first network equipment.

6. The method of claim 1, further comprising, estimating, by the centralized controller system, a capacity of the connection, resulting in a capacity estimate, wherein adjusting the characteristic of the connection is further based on the capacity estimate.

7. The method of claim 1, further comprising, estimating, by the centralized controller system, a traffic demand of the second network equipment for connections to the backhaul network, resulting in a demand estimate, wherein adjusting the characteristic of the connection is further based on the demand estimate.

8. The method of claim 7, further comprising, facilitating, by the centralized controller system, receiving, from the second network equipment, buffer information corresponding to a traffic buffer of the second network equipment, wherein estimating the traffic demand is based on information comprising the buffer information.

9. The method of claim 1, wherein the first network equipment comprises an access point operating as a relay node within an integrated access backhaul network topology.

10. The method of claim 1, further comprising, facilitating, by the centralized controller system, receiving radio resource management messages from source network equipment.

11. The method of claim 1, wherein the connection was selected from available connections between the first network equipment and the second network equipment.

12. A non-transitory machine-readable medium, comprising executable instructions that, when executed by a processor of an integrated access backhaul centralized controller system, facilitate performance of operations, comprising:

identifying a connection between first network equipment and second network equipment, wherein the first network equipment is connected to a user equipment and the second network equipment;

obtaining a monitoring result from a monitoring of the connection between the first network equipment and the second network equipment, wherein the second network equipment is communicatively coupled to backhaul network equipment, and wherein the user equipment is communicatively coupled to the backhaul network equipment via the second network equipment; and based on the monitoring result, adjusting a characteristic of the connection.

13. The non-transitory machine-readable medium of claim 12, wherein the operations further comprise, estimating a capacity of the connection, resulting in a capacity estimate, and wherein adjusting the characteristic of the connection is further based on the capacity estimate.

14. The non-transitory machine-readable medium of claim 12, wherein the operations further comprise, estimating a traffic demand of the second network equipment for connections to the backhaul network, resulting in a demand estimate, and wherein adjusting the characteristic of the connection is further based on the demand estimate.

* * * * *